US006981707B1

(12) United States Patent
Dandy

(10) Patent No.: US 6,981,707 B1
(45) Date of Patent: Jan. 3, 2006

(54) TELESCOPING COVER FOR SHOPPING CART HANDLE

(75) Inventor: Alexander W. Dandy, 4606 Sycamore Rd., Newport, MI (US) 48166

(73) Assignee: Alexander W. Dandy, Newport, MI (US)

( * ) Notice: Subject to any disclaimer, the term of this patent is extended or adjusted under 35 U.S.C. 154(b) by 72 days.

(21) Appl. No.: 10/811,687

(22) Filed: Mar. 29, 2004

(51) Int. Cl.
   - *B62D 39/00* (2006.01)
   - *B65D 65/02* (2006.01)
   - *B60R 7/00* (2006.01)

(52) U.S. Cl. .......................... 280/33.992; 280/33.993; 280/DIG. 4; 280/304.1; 150/155; 150/154; 16/DIG. 12; 224/409

(58) Field of Classification Search .......... 280/33.992, 280/33.993, DIG. 4, 304.1, 304.5; 16/DIG. 12, 16/DIG. 2, 110.1, 436; 224/409, 411; 150/154, 150/155, 165, 166; 297/219.1, 219.12; D12/13; D34/27; 160/62, 84.1; 4/605, 608, 609
See application file for complete search history.

(56) References Cited

U.S. PATENT DOCUMENTS

| | | | | |
|---|---|---|---|---|
| 2,803,849 A | * | 8/1957 | Peters | 16/421 |
| 2,962,827 A | * | 12/1960 | Lachance et al. | 40/308 |
| 3,866,649 A | * | 2/1975 | Bringmann | 16/422 |
| 4,805,937 A | | 2/1989 | Boucher et al. | |
| 4,881,746 A | | 11/1989 | Andreesen | |
| D328,812 S | * | 8/1992 | Pritchett | D34/27 |
| 5,154,166 A | * | 10/1992 | Chikama | 600/124 |
| 5,215,319 A | | 6/1993 | Farris | |
| 5,427,392 A | | 6/1995 | Duer | |
| 5,429,377 A | | 7/1995 | Duer | |
| 5,511,445 A | * | 4/1996 | Hildebrandt | 74/558.5 |
| 5,715,571 A | | 2/1998 | Fasano | |
| 5,722,672 A | | 3/1998 | Frederick | |
| 5,820,142 A | * | 10/1998 | Duer | 280/33.992 |
| 5,953,790 A | | 9/1999 | Auxier | |
| 6,065,764 A | | 5/2000 | Moseley | |
| 6,543,794 B1 | | 4/2003 | Tyree | |
| 6,817,066 B1 | * | 11/2004 | Williams et al. | 16/435 |
| 6,832,766 B2 | * | 12/2004 | Stokes | 280/33.992 |
| 6,869,085 B2 | * | 3/2005 | Pettigrew et al. | 280/33.992 |
| 2002/0000700 A1 | | 1/2002 | Alexsen et al. | |
| 2002/0092132 A1 | | 7/2002 | Kessler | |
| 2004/0021279 A1 | * | 2/2004 | Sobo et al. | 260/33.992 |

* cited by examiner

*Primary Examiner*—J. Allen Shriver
*Assistant Examiner*—G B Klebe
(74) *Attorney, Agent, or Firm*—MacMillan, Sobanski & Todd, LLC

(57) ABSTRACT

An adjustable portable protective cover for covering a shopping cart handle includes three elongated resilient tubular member telescoped together. The members include stops for retaining the members together in the fully extended position. The inner and outer members have a radially outwardly protuberance at a free end thereof. The members can be collapsed to a minimum length for storage and carrying. The members are formed of an easily cleaned material so that the cover can be reused.

11 Claims, 4 Drawing Sheets

US 6,981,707 B1

TELESCOPING COVER FOR SHOPPING CART HANDLE

BACKGROUND OF THE INVENTION

1. Field of the Invention

The present invention relates in general to a sanitary portable handle cover, and more particularly, to a sanitary portable handle cover for shopping carts to be used in a plurality of stores.

2. Description of the Related Art

It is common knowledge that the majority of consumers shopping at stores utilize shopping carts to assist in carrying products to the checkout counters of the stores and to their means of transportation. Such stores providing shopping carts for a consumer's use include grocery, hardware, and retail stores. It is also known that these shopping carts are handled by a plurality of shoppers and portions of the shopping carts namely the shopping cart handle may carry infectious viral and bacterial agents.

For a parent shopping with a small child utilizing the shopping cart there is typically incorporated within the shopping cart a seating area adjacent to the shopping cart handle for allowing a small child to ride in while the parent is able to freely shop without having the hold the small child. Although this may be a convenience for the parent, this may be a potential health issue for the small child. Small children are known to chew on handles of shopping carts which is a direct transmission mode of contracting an infectious agent. Furthermore, small children typically hold the shopping cart handle while riding in the shopping cart and are constantly placing their hands in their mouth as well rubbing their nose and eyes which are other modes of transmitting the infectious agents to the small child and/or from the child to the handle.

A variety of shopping cart handle covers are known to act as a protective barrier to cover a portion of the shopping cart handle for preventing the small child from touching the shopping cart handle. Because shopping carts and other tote devices may be of different widths, the known protective covers may only cover a portion of the shopping cart handle thereby leaving an uncovered portion exposed to the small child which may still present a health risk. For a parent to be assured they have a protective cover that overlays the entire shopping cart handle or the majority of the shopping cart handle, the parent would have to purchase and carry to each store a number of protective covers of different lengths which can ultimately be costly and burdensome.

SUMMARY OF THE INVENTION

It is an objective of the present invention to provide a protective cover to cover a handle of a shopping cart.

Another object of the invention is to provide a protective cover that is portable and practical to transport to different locations.

Still another object of the present invention is to provide a protective cover that is adjustable to cover a plurality of shopping cart handles of different widths.

The above as well as other objects of the present invention may be achieved by an adjustable portable protective cover for covering a shopping cart handle comprising a first elongated resilient tubular member having a longitudinal slot formed therein. The slot permits the first tubular member to be expanded in diameter to receive the shopping cart handle. A second elongated resilient tubular member also has a longitudinal slot formed therein for similar expansion. The first tubular member is slidingly received in an end of the second tubular member. A third tubular member having a longitudinal slot formed therein for similar expansion is provided. The third tubular member is slidingly received in the second tubular member and slidingly receives the first tubular member such that the protective cover according to the present invention expands or telescopes outwardly to cover any width of shopping cart handle and collapses or telescopes inwardly for ease of carrying and storage.

DETAILED DESCRIPTION OF PREFERRED EMBODIMENTS

Figure 1:
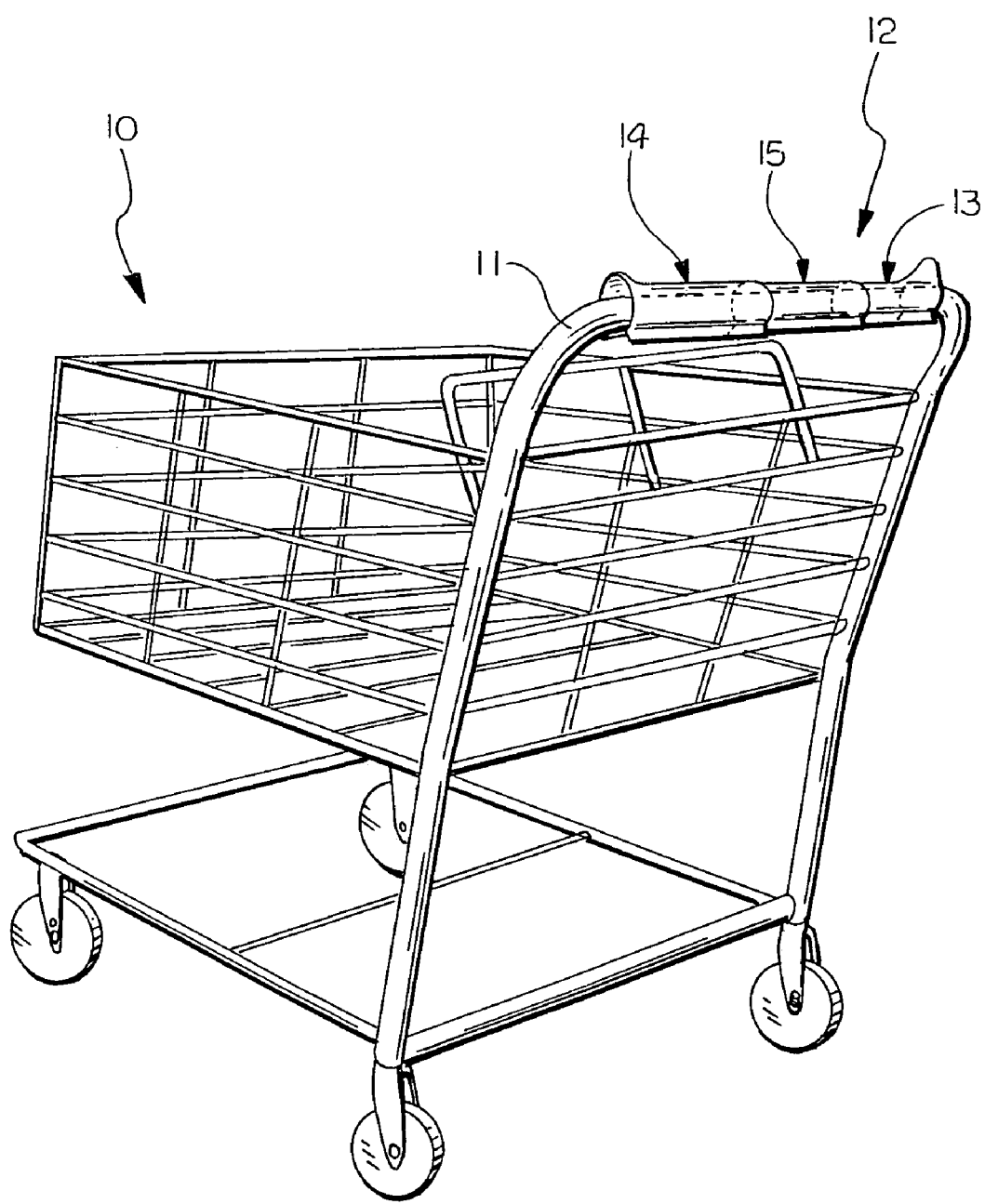
FIG. 1 is a perspective view of an adjustable protective cover according to the preferred embodiment of the present invention installed on a shopping cart handle in an expanded position.

Referring now to the drawings and particularly to FIG. 1, there is shown a shopping cart 10 typically made of metal or plastic. A shopping cart handle 11 extends upwardly and rearwardly away from a main basket portion of the shopping cart 10. The shopping cart handle 11 allows a person to push and maneuver the shopping cart 10. Inserted over the shopping cart handle 31 is an adjustable portable protective cover 10. A protective cover 12 according to the present invention covers the shopping cart handle 11. The protective cover 12 may be utilized on a plurality of different shopping carts having different width handles since it is adjustable in length as described below. The protective cover 12 protects a person operating the shopping cart 10 or a small child seated in the shopping cart 10 from direct contact with infectious agents disposed on a surface of the shopping cart handle 11. The protective cover 12 is collapsible, as described below, to allow the user to conveniently carry the protective cover to and from the store where the shopping carts are utilized. The protective cover 12 is preferably made of a resilient plastic material which allows the protective cover 12 to be easily sanitized when required.

Figure 2:
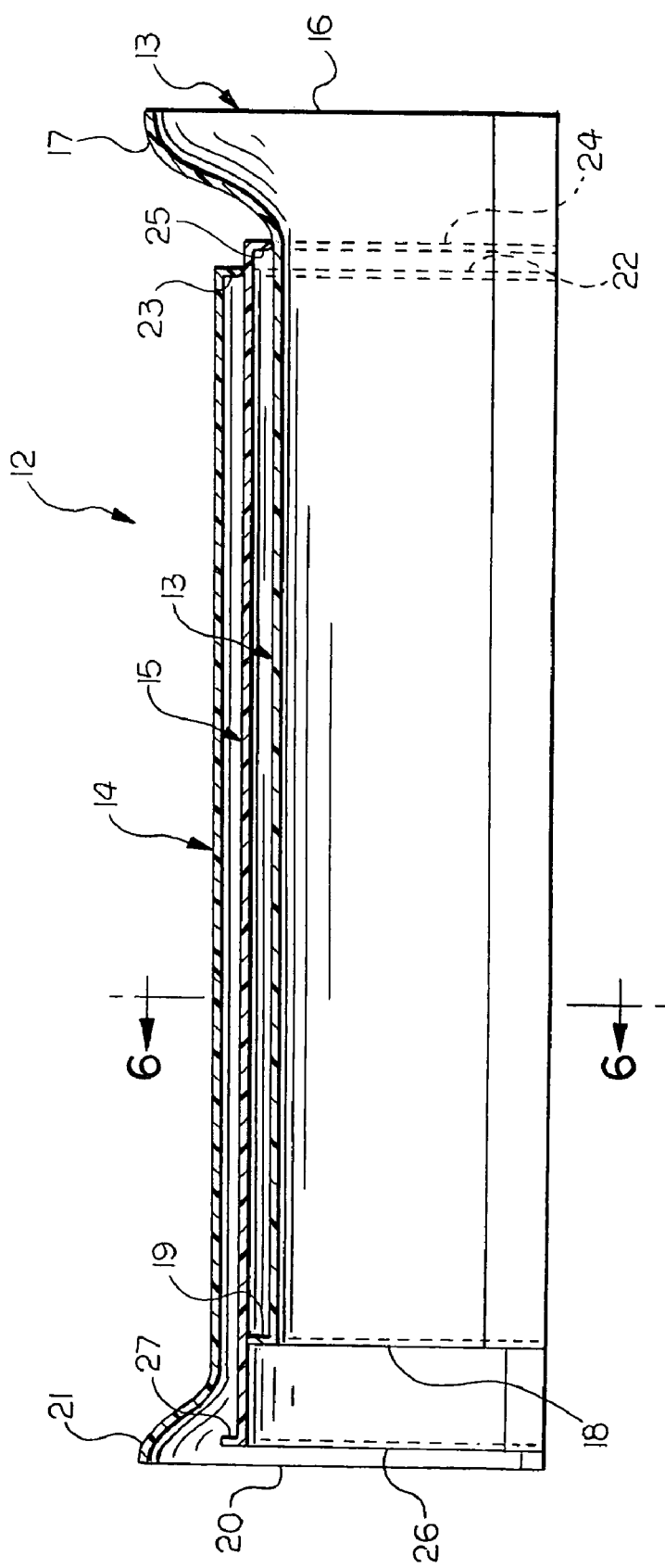
FIG. 2 is a front cross sectional view of the protective cover shown in FIG. 1 in a collapsed position.

FIG. 2 illustrates a front cross sectional view of the protective cover 12 in a collapsed position suitable for carrying and storage. The protective cover 12 includes a plurality of slideable tubular members. In the preferred embodiment, a first tubular member 13, a second tubular member 14 and a third tubular member 15 slidingly telescope together. Each of the tubular members 13, 14, 15 is formed as a resilient plastic tube having a longitudinal slot extending the full length thereof. Although plastic is the preferred material, other resilient materials could be used. The first tubular member 13 has a first end portion 16 with a radially outwardly extending protuberance 17 and an opposite second end portion 18 with a radially outwardly extending flange or stop 19. In the preferred embodiment, the first tubular member 13 is approximately seven and one half inches long and one and one quarter inches in diameter.

The second elongated resilient tubular member 14 is similar to the first member 13 having a first end portion 20 with a radially outwardly extending protuberance 21 and an opposite second end portion 22 with a radially inwardly extending flange or stop 23. In the preferred embodiment, the second tubular member 14 is approximately seven and one half inches long and one and three eighths inches in diameter. The protuberances 17 and 21 tend to prevent the hands of the user from coming into contact with uncovered portions of the cart 10 and the handle 11.

The third elongated resilient tubular member 15 has a first end portion 24 with a radially inwardly extending flange or stop 25 and an opposite second end portion 26 with a radially outwardly extending flange or stop 27. In the preferred embodiment, the third tubular member 15 is approximately seven and one half inches long and one and five sixteenths inches in diameter. Thus, in the preferred embodiment, the stops 19, 23, 25, 27 extend approximately one-sixteenth inch from the outer surfaces of the respective tubular member. By keeping the height of each stop small, the distances between the walls of the tubular member are minimized thereby providing for a uniform transitional surface area between each of the tubular members.

In operation, the stops 19 and 25 cooperate to prevent the second end 18 of the first member 13 from sliding out of the first end 24 of the third member 15. The stops 23 and 27 cooperate to prevent the second end 26 of the third member 15 from sliding out of the first end 22 of the second member 14. The tubular members 13, 14, 15 are sized to extend or telescope outwardly to fit shopping car handles as wide as approximately twenty-two and one half inches and to collapse or telescope inwardly to approximately eight inches for storage and carrying. Although the tubular members 13, 14, 15 are described as being of the same length, they can be of different lengths.

Figure 5:
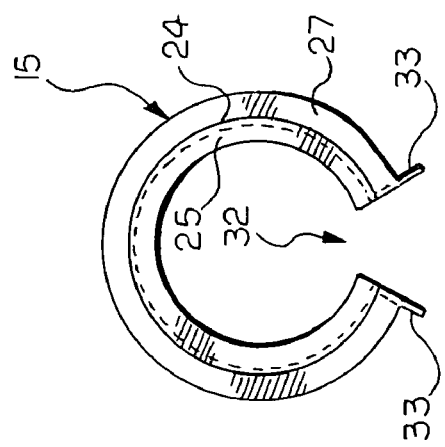
FIG. 5 is an end view of the third tubular member shown in FIG. 2.
Figure 4:
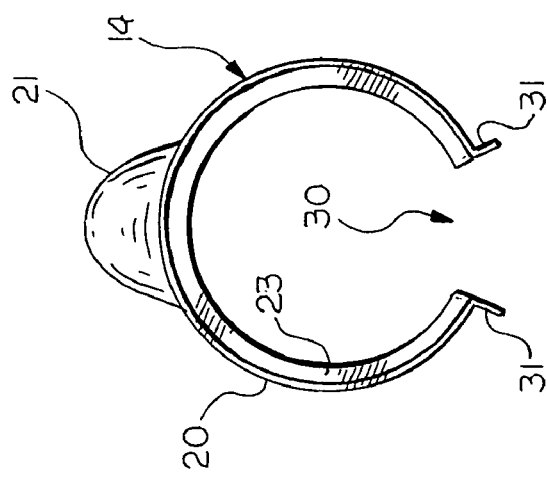
FIG. 4 is an end view of the second tubular member shown in FIG. 2.
Figure 3:
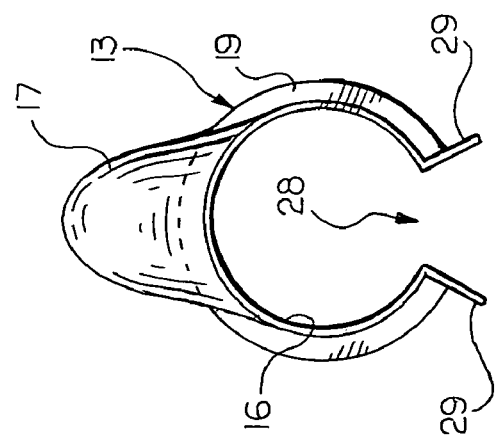
FIG. 3 is an end view of the first tubular member shown in FIG. 2.

FIG. 3 is a view from the first end 16 of the first member 13 showing a longitudinal slot 28 formed in a wall of the tubular member and extending the entire length thereof. A pair of radially outwardly extending flanges 29 is provided at the edges of the slot 28 and extends the length of the member 13. FIG. 4 is a view from the first end 20 of the second member 14 showing a longitudinal slot 30 formed in a wall of the tubular member and extending the entire length thereof. A pair of radially outwardly extending flanges 31 is provided at the edges of the slot 30 and extends the length of the member 14. FIG. 5 is a view from the first end 24 of the third member 15 showing a longitudinal slot 32 formed in a wall of the tubular member and extending the entire length thereof. A pair of radially outwardly extending flanges 33 is provided at the edges of the slot 32 and extends the length of the member 15.

Figure 8:
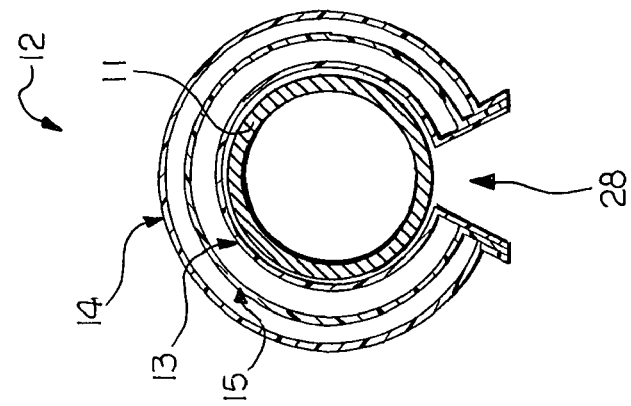
FIG. 8 is a view similar to FIG. 7 showing the protective cover installed on the shopping cart handle.
Figure 7:
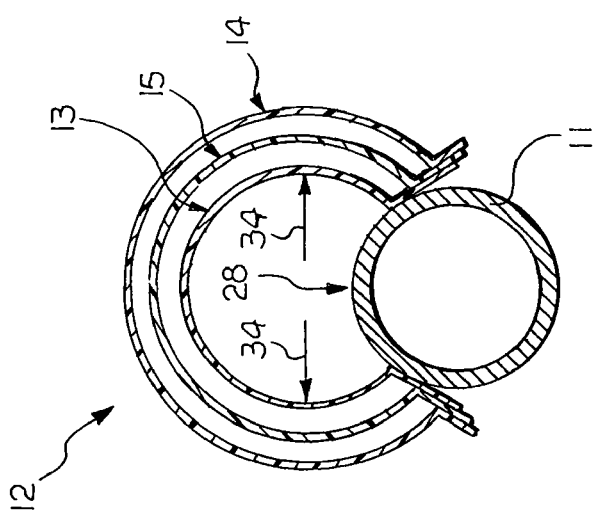
FIG. 7 is a view similar to FIG. 6 showing the tubular members being expanded to fit over the shopping cart handle.
Figure 6:
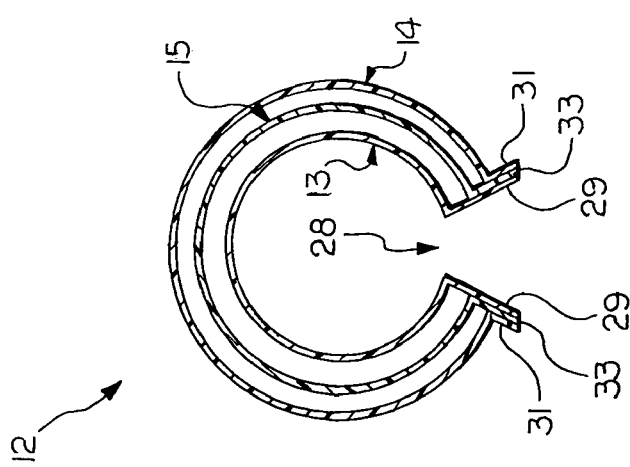
FIG. 6 is a view of protective cover in cross section taken along the line 6—6 in FIG. 2.

FIG. 6 shows the protective cover 12 in cross section prior to installation on a shopping cart handle. The protective cover 12 is shown in cross-sectional view FIG. 7 expanded in a radial direction indicated by arrows 34 to expand the slots 28, 30, 32 in order to receive the shopping cart handle 11 in the interior of the tubular members 13, 14, 15. In the cross-sectional view FIG. 8, the protective cover 12 is shown installed on the handle 11 wherein the slot 28 has returned to a width slightly wider than the uninstalled width shown in FIG. 6.

In accordance with the provisions of the patent statutes, the present invention has been described in what is considered to represent its preferred embodiment. However, it should be noted that the invention can be practiced otherwise than as specifically illustrated and described without departing from its spirit or scope. For example, other types of internal/external stops may be utilized to created the interference conditions as described above. Also, the third member could be eliminated so that the first member cooperates with the second member in the manner described above. Furthermore, more than three tubular members may be utilized so that a respective protective cover may be collapsible to a smaller length.

What is claimed is:

1. A telescoping protective cover for covering a shopping cart handle, comprising:
    at least two elongated resilient tubular members, a first of said members having a first open end, a protuberance extending radially outwardly from said first end, an opposite second open end, a radially outwardly extending first stop being formed adjacent said second end, and a longitudinal slot extending a length of said first member; and
    a second of said members having a first open end, a protuberance extending radially outwardly from said first end of said second member, an opposite second open end, a radially inwardly extending second stop being formed adjacent said second end of said second member, and a longitudinal slot extending a length of said second member,
    wherein said second end of said first member is slidably received in said second end of said second member and said first stop cooperates with said second stop to prevent removal of said first member from said second member, whereby said first and second members telescope to correspond to a width of a shopping cart handle to be covered by the protective cover.

2. The protective cover according to claim 1 wherein said first, second and third members each have a pair of radially outwardly extending flanges extending along opposite sides of respective ones of said slots.

3. The protective cover according to claim 1 wherein said first, second and third members are formed of a plastic material.

4. A telescoping protective cover for covering a shopping cart handle, comprising:
    a first elongated resilient tubular member having a first open end, an opposite second open end, and a radially outwardly extending first stop being formed adjacent said second end;
    a second elongated resilient tubular member having a first open end, an opposite second open end, and a radially inwardly extending second stop being formed adjacent said second end of said second member; and
    a third elongated resilient tubular member having a first open end, an opposite second open end, a radially inwardly extending third stop being formed adjacent said first end of said third member, and a radially outwardly extending fourth stop being formed adjacent said second end of said third member,
    wherein said second end of said first member is slidably received in said second end of said third member and said first stop cooperates with said third stop to prevent removal of said first member from said third member, said second end of said third member is slidably received in said second end of said second member and said second stop cooperates with said fourth stop to prevent removal of said third member from said second member, whereby said first, second and third members telescope to correspond to a width of a shopping cart handle to be covered by the protective cover.

5. The protective cover according to claim 4 wherein at least one of said first end of said first member and said first end of said second member includes a protuberance extending radially outwardly from said first end.

6. The protective cover according to claim 4 wherein said first, second and third members are formed of a plastic material.

7. The protective cover according to claim 4 wherein said first, second and third members each have a longitudinally extending slot formed therein for passing the shopping cart handle.

8. The protective cover according to claim 7 wherein said first, second and third members each have a pair of radially outwardly extending flanges extending along opposite sides of respective ones of said slots.

9. A telescoping protective cover for covering a shopping cart handle, comprising:
- a first elongated resilient tubular member having a first open end, a protuberance extending radially outwardly from said first end, an opposite second open end, a radially outwardly extending first stop being formed adjacent said second end, and a longitudinal slot extending a length of said first member;
- a second elongated resilient tubular member having a first open end, a protuberance extending radially outwardly from said first end of said second member, an opposite second open end, a radially inwardly extending second stop being formed adjacent said second end of said second member, and a longitudinal slot extending a length of said second member; and
- a third elongated resilient tubular member having a first open end, an opposite second open end, a radially inwardly extending third stop being formed adjacent said first end of said third member, a radially outwardly extending fourth stop being formed adjacent said second end of said third member, and a longitudinal slot extending a length of said third member, wherein said second end of said first member is slidably received in said second end of said third member and said first stop cooperates with said third stop to prevent removal of said first member from said third member, said second end of said third member is slidably received in said second end of said second member and said second stop cooperates with said fourth stop to prevent removal of said third member from said second member, whereby said first, second and third members telescope to correspond to a width of a shopping cart handle to be covered by the protective cover.

10. The protective cover according to claim 9 wherein said first, second and third members each have a pair of radially outwardly extending flanges extending along opposite sides of respective ones of said slots.

11. The protective cover according to claim 9 wherein said first, second and third members are formed of a plastic material.

* * * * *